(12) United States Patent
Hawkins et al.

(10) Patent No.: US 7,146,500 B2
(45) Date of Patent: Dec. 5, 2006

(54) SYSTEM FOR OBTAINING SIGNATURES ON A SINGLE AUTHORITATIVE COPY OF AN ELECTRONIC RECORD

(75) Inventors: Charles F. Hawkins, Virginia Beach, VA (US); Donald J. Plaster, Virginia Beach, VA (US); Scott G. Ainsworth, Virginia Beach, VA (US)

(73) Assignee: Compass Technology Management, Inc., Chesapeake, VA (US)

( * ) Notice: Subject to any disclaimer, the term of this patent is extended or adjusted under 35 U.S.C. 154(b) by 830 days.

(21) Appl. No.: 09/993,132

(22) Filed: Nov. 14, 2001

(65) Prior Publication Data

US 2003/0093679 A1   May 15, 2003

(51) Int. Cl.
*H04L 9/00* (2006.01)
*H04L 9/32* (2006.01)

(52) U.S. Cl. .................. 713/176; 713/181; 726/27; 726/30; 705/75

(58) Field of Classification Search ............. 713/176, 713/181; 726/27, 30; 705/75
See application file for complete search history.

(56) References Cited

U.S. PATENT DOCUMENTS

| | | | | |
|---|---|---|---|---|
| 5,465,299 A | * | 11/1995 | Matsumoto et al. | 713/176 |
| 5,659,616 A | * | 8/1997 | Sudia | 705/76 |
| 5,673,316 A | * | 9/1997 | Auerbach et al. | 705/51 |
| 5,748,738 A | * | 5/1998 | Bisbee et al. | 713/176 |
| 6,070,239 A | * | 5/2000 | McManis | 713/187 |
| 6,212,281 B1 | * | 4/2001 | Vanstone | 380/282 |
| 6,237,096 B1 | * | 5/2001 | Bisbee et al. | 713/178 |
| 6,314,468 B1 | * | 11/2001 | Murphy et al. | 709/236 |
| 6,327,656 B1 | * | 12/2001 | Zabetian | 713/176 |
| 6,948,069 B1 | * | 9/2005 | Teppler | 713/178 |
| 2001/0011350 A1 | * | 8/2001 | Zabetian | 713/176 |

\* cited by examiner

*Primary Examiner*—Christopher Revak
*Assistant Examiner*—Kaveh Abrishamkar
(74) *Attorney, Agent, or Firm*—Bowman Green Hampton & Kelly, PLLC

(57) ABSTRACT

A method and apparatus for maintaining control of a record which may have transferable value wherein the system provides for digitally signing a record in a partially-trusted distributed environment and allows a single unique authoritative copy to be held at a repository. The system meets the uniqueness and retainability requirements of current legislation relating to electronic transactions and allows electronic records to receive the same legal enforceability as paper documents. One or more secure servers along with maintenance control software provide the secure environment for parties wishing to complete electronic transactions to form legally enforceable agreements.

36 Claims, 9 Drawing Sheets

SYSTEM FOR OBTAINING SIGNATURES ON A SINGLE AUTHORITATIVE COPY OF AN ELECTRONIC RECORD

BACKGROUND OF THE INVENTION

1. Field of the Invention

The present invention relates generally to the field of computer security, especially relating to electronic records.

2. Description of Related Art

Modern technology has profoundly changed the way business transactions are conducted today. The use of computers and other data processing devices are now commonplace in both large and small businesses. The connectivity provided by intranets and the Internet have reduced information transfer times from days down to seconds. For a reasonable investment, small businesses and even non-profit organizations can acquire communications benefits similar to those of large high-technology corporations.

Governments, too, have taken advantage of the cost and time savings benefits offered by electronic communications. Electronic filing of U.S. income tax returns is now the preferred method of filing a return by the U.S. government. Transferring documents electronically eliminates postage and shipping charges and allows documents to be received at their destination almost instantaneously.

In recognition of the general acceptance of using electronic communications in the business place, laws regulating electronic communications have begun to be developed and adopted. More laws are likely to come about, or existing laws revised, as acceptance of electronic communications continues to grow and become more highly developed in the future.

The purpose of laws, such as the Uniform Electronic Transactions Act (UETA) and the e-Sign Act, is to validate the authority of electronic transactions to legally bind one party to another party, and to provide a legal framework for enforcement.

The system described in this patent application is a system for secure, enforceable electronic communications.

An understanding of several industry-standard definitions is necessary to be able to evaluate the importance of this system and compare it with other solutions currently available or that may become available as the use of electronic business transactions continues to increase.

An electronic transaction is any type of business that is conducted by electronic means, such as by computer, Personal Device Assistants (PDAs), and other devices not yet invented. For example, the transaction may consist of ordering a book or other product from a Web site and making payment by electronic means, such as providing credit card information or debiting the payment from a checking account.

An electronic record, according to the Electronic Signatures in Global and National Commerce Act (E-Sign), is "a contract or other record created, generated, sent, communicated, received, or stored by electronic means."[1] The E-Sign Act further states that a record must be retrievable in perceivable form.[2]

A repository is the secure environment in which electronic records are maintained. The repository must encompass sufficient security methods to ensure safe storage and integrity of the electronic record.

An electronic signature is "an electronic sound, symbol, or process attached to or logically associated with a contract or other record and executed or adopted by a person with the intent to sign the record."[3]

A message digest is a compressed representation of an electronic record. Message digests are produced using standard, published, one-way hashing algorithms. Message digests produced by the same algorithm generally are the same length in bits. The message digest will be considered a unique valid representation of the electronic record because it is computationally infeasible for two different electronic records to produce the same message digest while using the same message digest function.

Message digest algorithms currently on the market, such as MD-2, MD-4, MD-5, SHA-1, and SHA-256, take specific portions of the record (512 bits or 1024 bits) and create a message digest of that portion. This hash of the set length of bits produces a set of hex chain values. The chain values are summed bitwise along with a seed value to produce the final message digest. For SHA-1, as an example, five 32-bit chain values are produced for each 512 bits of data. A full history of Public Key Cryptography (PKC) systems is described in W. Diffie's, "The First Ten Years of Public-Key Cryptography," which is incorporated herein by reference.

A digital signature is a form of electronic signature, generated by computer hardware or software and represented in a computer as a string of binary digits. The methods of producing a digital signature involve a set of rules and a set of parameters such that the digital signature produced is unique and verifiable. Both the identity of the signatory (person represented by the digital signature) and the integrity of the data (binary bits making up the digital signature) can be verified. Today, the first step in generating a digital signature is typically the generation of a message digest, usually much smaller than the electronic record on which it is based. The message digest will be unique because it is computationally infeasible for two different electronic methods to produce the same message digest on the same electronic record; therefore, the use of a message digest as a representation of the electronic record is considered valid. The second step in generating a digital signature is to cryptographically combine the message digest and an asymmetric private key. Standards for generation of digital signatures will be known to those of ordinary skill in the art.

A Public Key Cryptography (PKC) system is an asymmetric encryption system, meaning that it employs two keys, one for encryption and one for decryption or validation of what is encrypted. Asymmetric systems adhere to the principle that knowledge of one key (the public key) does not permit derivation of the second key (the private key). Thus, PKC permits the user's public key to be posted, in a directory or on a bulletin board for example, without compromising the user's private key. This public key concept simplifies the key distribution process. Popular PKC systems make use of the fact that finding large prime numbers is computationally easy but factoring the products of two large prime numbers is computationally infeasible. Example PKC algorithms are the Digital Signature Algorithm (DSA)[4], the Rivest, Shamir, and Adleman (RSA) algorithm, as specified in Internet Engineering Task Force (IETF) Request for Comments (RFC) 2347 and its successors.

A private key is the half of a Public Key Cryptography (PKC) pair that is kept private and secret, and is used to generate a digital signature.

A public key is the half of a PKC pair that is published, and is used to verify a digital signature. Each person involved in an electronic transaction based on the private and public key method of digital signature generation and verification will possess a private and public key pair. A public key may be known to the public in general, but a private key is never shared. Anyone can verify a person's digital signature by using that person's public key, but only the possessor of a person's private key may generate a digital signature. More information about how public keys and private keys work is contained later in this section.

Typically, public and private keys are used as the means of allowing for the generation and verification of digital signatures. Public-key encryption schemes, commonly called PKC, are well known and utilize a public key and a private key that are mathematically related. Based on a public-key/private-key pair, digital messages can be encrypted by either of the keys and decrypted by the other, with the public keys recorded in a public directory, which is publicly accessible, and the private key privately retained. Typically, the signer of the message accesses the public-key directory and retrieves the receiver's public key. Then the signer encrypts the message with the receiver's public key, and conveys the encrypted message to the receiver. The receiver, upon receiving the encrypted message, decrypts the message with his private key.

PKC can also be used to generate a digital signature to authenticate the signer. Typically, the signer creates a message digest of the electronic record. After generating the message digest, the signer creates a digital signature from the message digest with his private key. The receiver, upon receiving the digital signature and the message, uses the signer's public key to verify the signature. This process is performed iteratively until the entire electronic record has been hashed. This operation ensures the identity of the signer because he is the only person who can encrypt the message with his private key.

Besides the PKC method, another encryption method is the symmetric algorithm. An example of this is the Data Encryption Standard (DES), which is described in Data Encryption Standard, Federal Information Processing Standards Publication 46 (1977) ("FIPS PUB 46," and its successors) that are available from the U.S. Department of Commerce. In general, a symmetric cryptographic system is a set of instructions, implemented in either hardware, software, or both, that can convert plain text into ciphertext, and vice versa. In a symmetric cryptographic system, a specific key is used that is known to the users but is kept secret from others.

A blue ink signature is a physically-produced signature made by a person using an ink pen, regardless of the color of the ink or the legibility of the signature. An "X" or a scribble can suffice as a legally-binding signature provided that both parties involved in the transaction have agreed upon the existence of an ink mark in a particular area or areas of the physical record constitutes agreement by the signer to the terms contained within the physical record. When the agreement states that a witness or notary public must observe and verify that the signer did intend to demonstrate agreement to the terms of the physical record by placing an ink signature, or mark, in the appropriate areas, then the signature and/or stamp of a witness or notary public must be present on the physical record in order for the transaction to be legal and enforceable.

A person is defined as "an individual, corporation, business trust, estate, trust, partnership, limited liability company, association, joint venture, governmental agency, public corporation, or any other legal or commercial entity."[5]

An authoritative copy is the best available copy of a document. The best available document may indeed be the original, but when an exact original cannot be found, then the best available copy of a document becomes the authoritative copy. The authoritative copy must be clearly identifiable as an authoritative copy. Thus, the authoritative copy must be associated with a means of establishing, identifying, maintaining, and enforcing control of the authoritative copy.

Current law has established that senders and receivers of transferable electronic records have rights equal to those of senders and receivers of equivalent paper records.

The significance of current acts such as the Electronic Signatures in Global and National Commerce Act (E-Sign) and the Uniform Electronic Transactions Act (UETA) is that electronic records, exchanged between two parties who have agreed to conduct a transaction by electronic means, and with the ability for the electronic records to be retrieved by both parties, shall be valid, legal transactions enforceable just as if they contained "blue ink" signatures. "Retrieved," as used in the preceding sentence, means the document must be able to be stored and printed by the receiver.

Computers and other electronic devices, such as Personal Digital Assistants (PDA) and cellular telephones, provide the interface terminals from which parties to a business transaction may take advantage of the many benefits of electronic communications. One of the most important benefits of electronic communications is the ability to communicate and transact business with a person, or groups of people, almost anywhere in the world. Electronic communications can take place over telephone lines, the Internet, and through the air via cellular and satellite communication systems.

Computers, and other electronic devices, receive digital information into their memory and present the information to a user. The information can be present in different ways, such as visual displays, voice and other audio output through a speaker, and by printing the information. A combination of the output methods, commonly referred to as multimedia, is intended to enhance the user's understanding of the communicated information. Computers and other electronic devices can display information in the form of text, graphs, pictures, and video.

It should be understood that for purposes of this patent application, we are defining an electronic transaction environment as any technology that allows two computers to communicate with each other. Thus, the words electronic and digital are essentially interchangeable. A network, intranet, or The Internet is not necessary; for example, a PDA could communicate with a standalone computer using infrared signalling. The process of retrieving files from one computer or interface terminal device (such as a PDA) to another is called downloading. The process of sending files to another computer or interface terminal is called uploading.

Computers and hardware alone are not sufficient to complete electronic transactions. Software is also needed to provide for security between the transacting parties and to allow the parties to digitally sign electronic records.

SUMMARY OF THE INVENTION

The invention sets forth a secure method of processing and/or handling of electronic records. In the Background of the Invention section, we presented an overview and definitions related to electronic records. In this section, we address currently known problems associated with electronic transactions, and describe how our invention resolves these problems.

A key problem associated with electronic records is the potential to have many duplicates. The invention allows and guarantees a unique copy of an electronic record.

A secure and legally enforceable electronic transaction must allow for the secure maintenance of control of the resulting electronic record. For the purposes of this patent application, repository is the term used to describe the secure environment in which the electronic record is maintained.

The electronic record in the repository is referred to as the authoritative electronic record. Control is maintained in the repository by software and at least one secure computer. The authoritative electronic record may represent a legally enforceable writing. A copy of the authoritative electronic record can be electronically transmitted over a network to a computer. This copy of the authoritative electronic record can be used to digitally sign the authoritative electronic record, which remains at the repository.

The copy of the authoritative record can be viewed, printed, and saved at, as well as retransmitted from, the remote location without compromising the integrity of the authoritative record at the repository. The method comprises receiving an electronic record in the repository, creating an authoritative electronic record of the received record by appending information to the end of the electronic record, digitally signing the electronic record and appended information to form a receipt, prepending this receipt information to the beginning of the electronic record, appending additional information to the end of the electronic record, and storing this whole as the authoritative electronic record in the repository. The authoritative electronic record is unique since no other exact representation of it exists anywhere else outside the repository. The concatenated whole of all information prepended to the beginning of the record is referred to as the beginning information. The concatenated whole of all information appended to the end of the electronic record is referred to as the ending information.

When a copy of the authoritative electronic record is requested by a person at a remote location, a copy is made by making a copy of the electronic record and the appended ending information only. The system then provides for transmitting a version of the copy to the person at the remote location, wherein transmission may be over the un-trusted network, and the copy of the authoritative electronic record may be printed and stored at the remote location. Software at the remote location provides for receiving the version of the copy of the authoritative electronic record and digitally signing the authoritative electronic record. A message digest is created at the remote location by retrieving a partially completed message digest from the repository and completing the computation of the message digest over the copy of the authoritative electronic record and some appended identifying information. The digital signature on the authoritative electronic record at the repository is then created at the remote location using this message digest just created at the remote location and the private key. The person then transmits the new digital signature and identifying information of the new digital signature back to the secure environment where the repository provides for validating the digital signature of the authoritative electronic record signed at the remote location against the existing authoritative electronic record stored at the repository through standard digital signature validation techniques.

Upon affirmative validation of the digital signature, a revised authoritative electronic record is generated. The revised authoritative electronic record is created by prepending the digital signature to the existing beginning information of the authoritative electronic record, appending additional information to the ending information of the authoritative electronic record, and storing the revised authoritative electronic record in the repository. The additional information appended to the ending information can include information indicating authorization for generating the revised authoritative electronic record, signatory information, and other information.

A key point of the present invention is that it leaves only one instance of a unique authoritative electronic record, which resides in the secure repository. The present invention does not prevent the ability to make copies of the record, but it does ensure that copies made are easily distinguished as copies.

Another key point of the present invention is that it allows a person to electronically sign an electronic record at a remote location without compromising the uniqueness of a corresponding authoritative electronic record.

Another key point of the present invention is to provide a method for revising authoritative electronic records that is secure, verifiable, and includes clear identification of involved parties.

The method our system uses meets all of the above requirements.

BRIEF DESCRIPTION OF THE DRAWINGS

The invention of the present application will now be described in more detail with reference to the accompanying drawings, given only by way of example, in which.

DETAILED DESCRIPTION OF THE INVENTION

Figure 1:
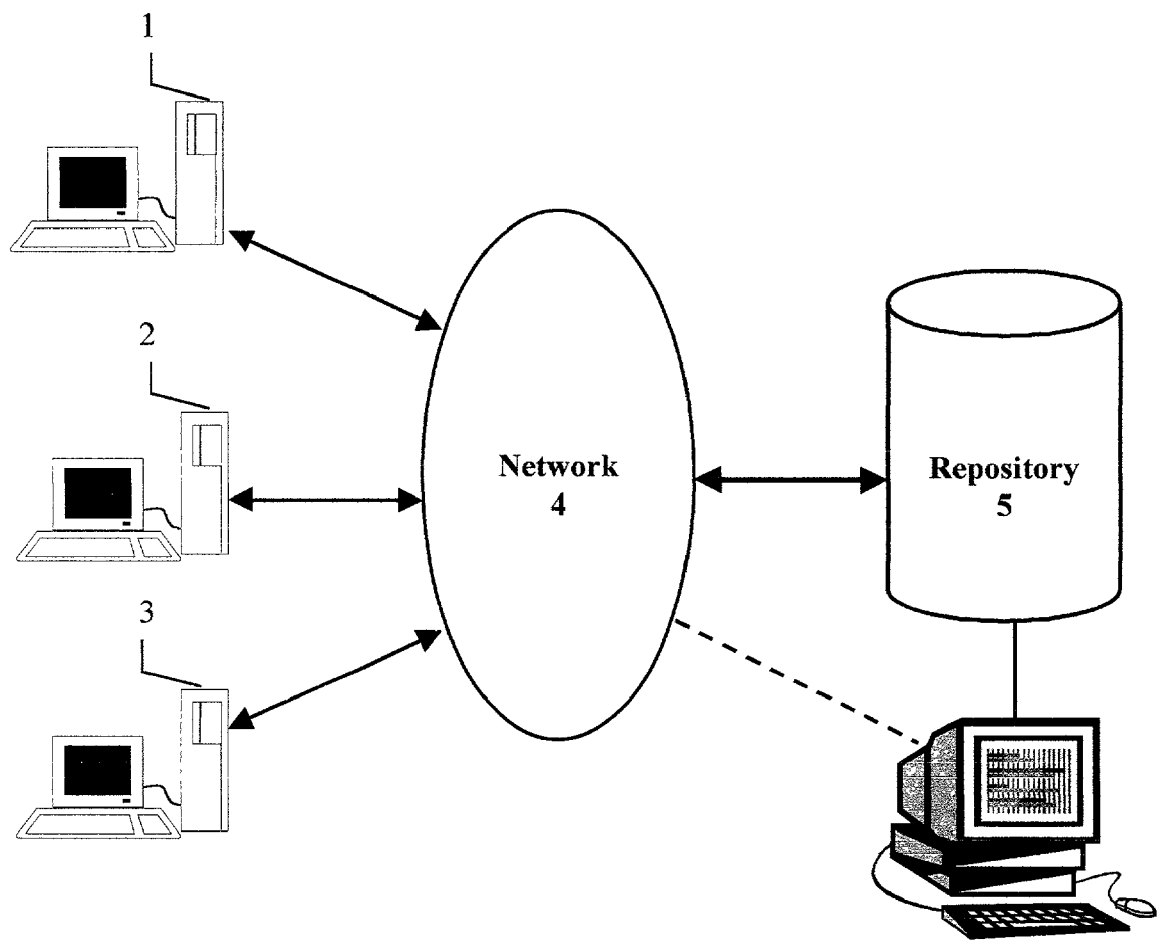
FIG. 1 is a block diagram of communication links between the present apparatus and remote locations.

FIG. 1 shows remotely located computers 1–3 connected to the present repository 5 via a network 4. Computers 1–3 represent all electronic devices that can transmit and display a record, such as other servers, personal computers, laptop computers, personal digital assistants (PDAs), and cellular telephones. Network 4 includes the Internet and other networks, such as private local area networks (LANs), over which the electronic record may be transmitted. Repository 5 comprises one or more secure servers and record maintenance software for ensuring the integrity of electronic records therein. Of course a computer or other electronic device may also be directly connected to repository 5.

Figure 2:
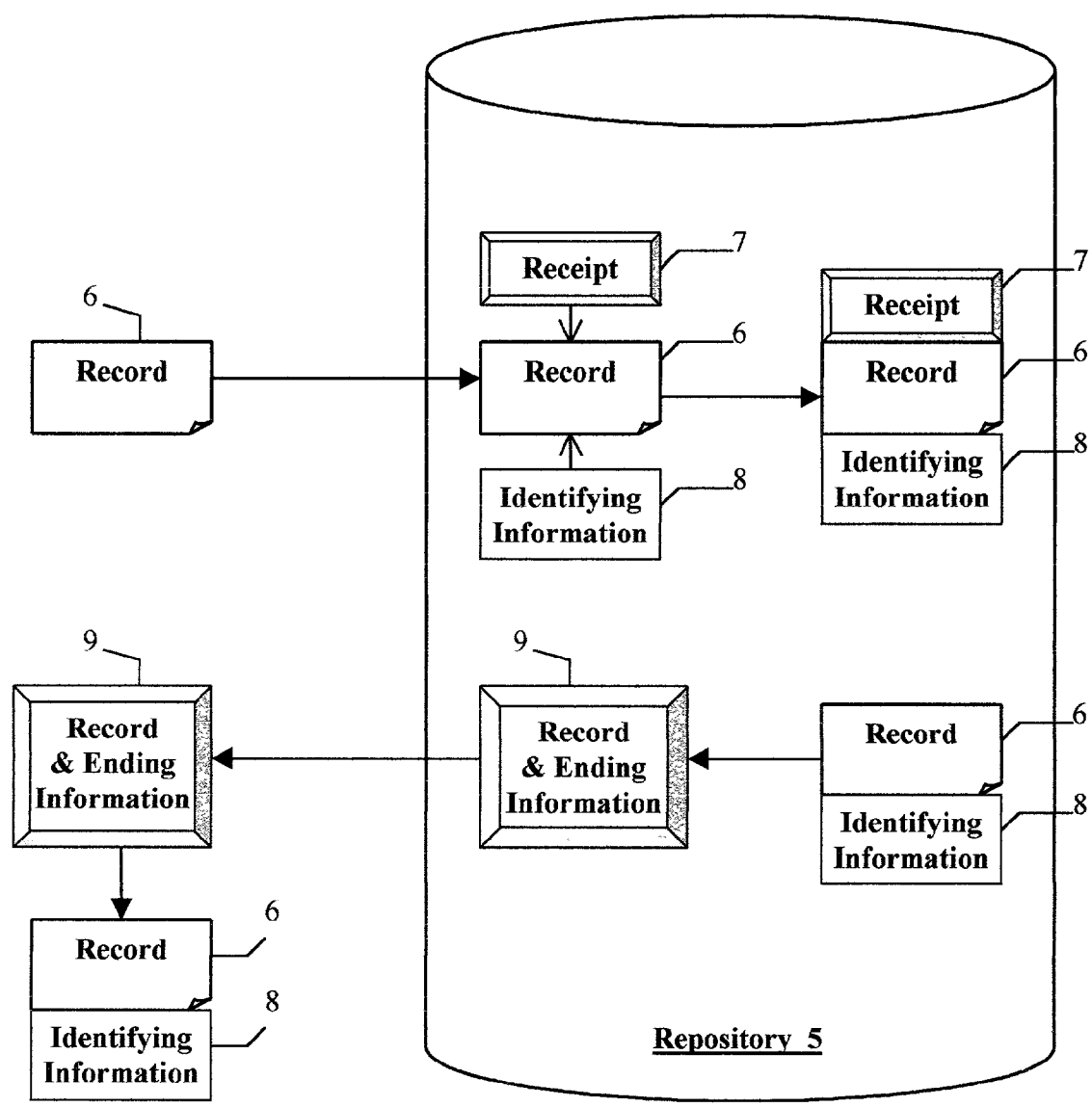
FIG. 2 is a block diagram showing receipt of a record at a repository, generation of an authoritative record in the repository, and the transmission of a copy of the authoritative record to a remote location.

FIG. 2 shows the initial operation of the present system. Record 6 is sent from a remote location to the repository 5. Record 6 is receipted within repository 5 by prepending receipt 7 to the beginning of record 6 and appending receipt 8 to the end of record 6. In an exemplary embodiment, receipt 7 is the repository's digital signature of the combination of both record 6 and some identifying information. Receipt 8 includes the identifying information and a message digest of the combination of both record 6 and the identifying information. Identifying information can include a time-stamp and the originator of the record. All information that has been encrypted, including actual digital signatures in FIGS. 2–4, is shown in double-framed format.

In operation, a time-stamp is attached to every record received in the present repository. The time-stamp includes time and date of receipt in the repository. The receipted record 6-8 is now the authoritative record or authoritative copy of the record and is stored in a secure location within the repository 5. The concatenated whole of all information prepended to the beginning of the record 6 is referred to as the beginning information. The concatenated whole of all information appended to the end of the record 6 is referred to as the ending information.

When a person at a remote location requests the authoritative record, to review or to sign, record maintenance software stored and executed in repository 5 produces a distinct copy of the authoritative record. All copies that are made of an authoritative record, in this system, comprise the record and the record's ending information. Receipt 7, the only beginning information in our example so far, is notably missing from the copy 6 and 8 that is sent to the requesting person. In this embodiment, the copy 6 and 8 is encrypted 9 with a shared secret symmetric key while being transmitted to the remote location. At the remote location, the person decrypts the encrypted copy 9 using the shared secret symmetric key. The person is then able to view, store, and print the copy.

Figure 3:
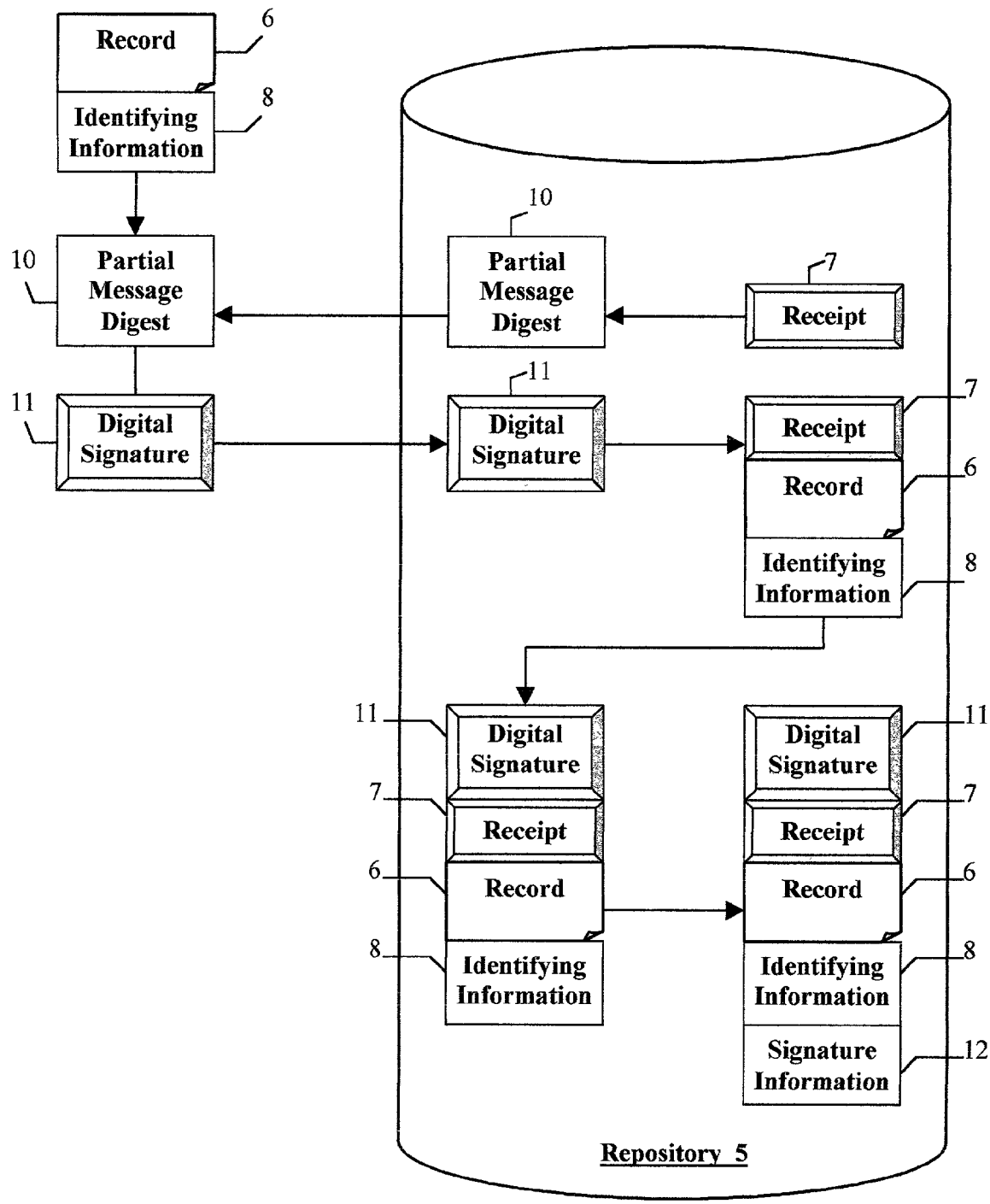
FIG. 3 is a block diagram showing the generation of a digital signature at a remote location and the transmission of that digital signature to the repository.
Figure 4:
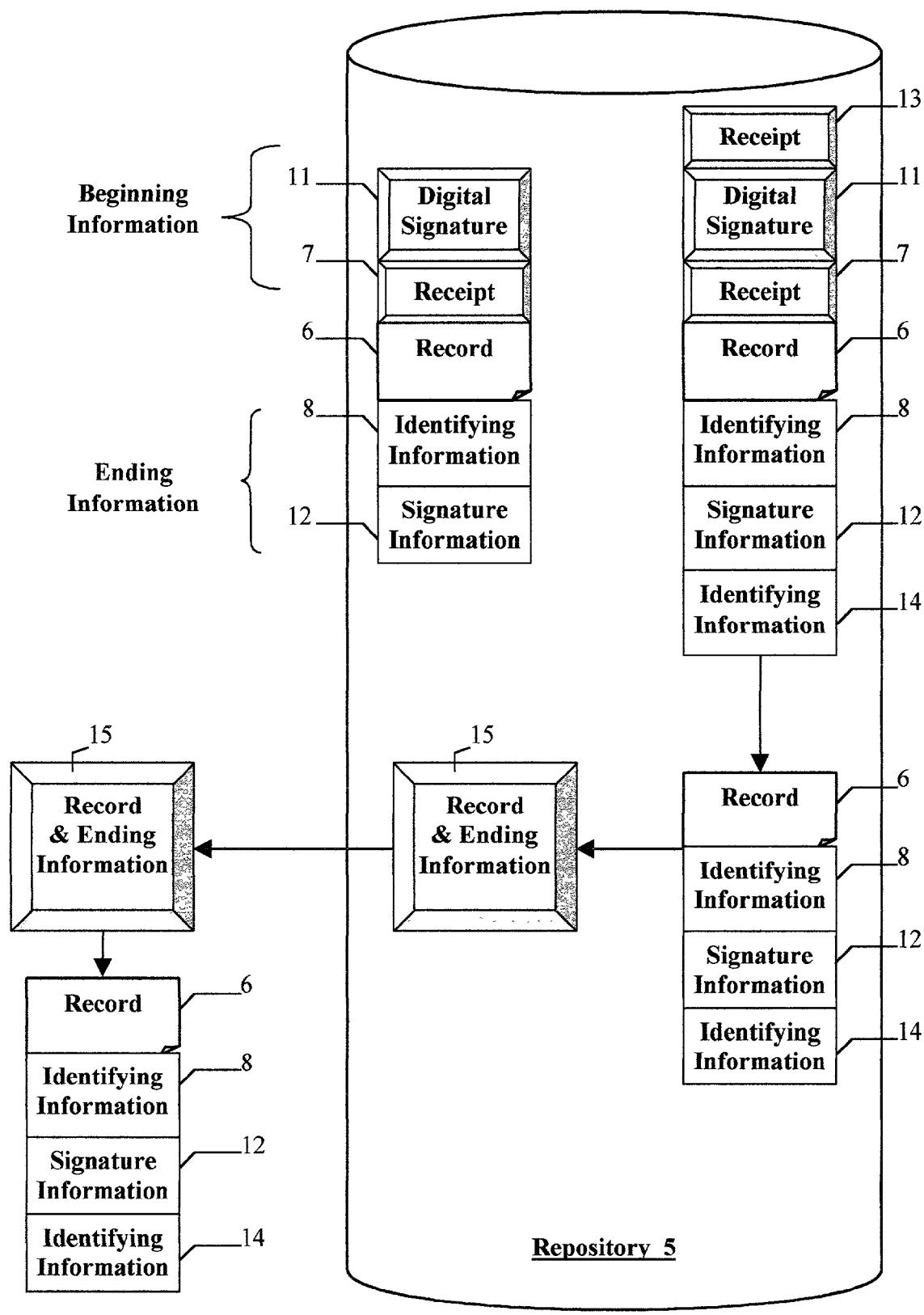
FIG. 4 is a block diagram showing generation of a revised authoritative record, copying of the revised authoritative record, and transmission of the copy to a remote location.

FIG. 3 begins with the process of signing the authoritative record at the remote location. The person at the remote location has in their possession the copy of the authoritative record 6 and 8. In order to sign the authoritative record 6-8, the person first needs to compute a message digest of the authoritative record 6-8. However, since the remote location does not have receipt 7, the person cannot immediately compute the required message digest. Sending an exact copy of receipt 7 to the remote location would destroy the uniqueness of the authoritative record 6-8 stored in the repository 5. In order to maintain the uniqueness of authoritative records in the repository 5, only a representation of the beginning information, receipt 7 in this case, is sent to the remote location. A partial message digest 10 is computed at the repository 5 that is based on all of the beginning information. In this case, the partial message digest 10 is only based on receipt 7. The partial message digest 10 is composed of at least two pieces of information, the interim chaining values (defined below) and the digital length in bits of the prepended beginning information.

The interim chaining values are computed in two steps. The first step involves padding to a known bit value the existing beginning information with the necessary bits to make the bit length of the beginning information an integer multiple of a certain bit length required for the given message digest algorithm. The same message digest algorithm will also be employed to complete the message digest used in the desired digital signature at the remote location. The second step involves inputting the now padded bit stream of the beginning information into the message digest algorithm to produce the interim chaining values. This process of creating the chaining values is called "interim" because the final hashing of the entire message is not completed at the repository 5. Rather, this final hashing will be completed at the remote location.

Once the partial message digest 10 is computed in repository 5, the resulting partial message digest 10 must be transmitted to the remote location. The person at the remote location receives partial message digest 10 and uses the partial message digest 10 to reseed the same message digest algorithm mentioned above and finishes generating a complete message digest by inputting his copy 6 and 8. The complete message digest represents copy 6 and 8 and receipt 7. Optionally, additional identifying information from the remote location may be included with identifying information 8 when the message digest is computed.

The person then uses his private key to create a digital signature with the complete message digest, thereby signing the receipted record 6-8 and producing digital signature 11. The digital signature 11 may include encoding information. In this embodiment, a small hardware token or smart card provides the private key used by the person for digitally signing. Alternatively, in some circumstances, a software-based private key may be used. Digital signature 11 along with any identifying information is then transmitted to repository 5 where it is validated with the public key and a recomputed message digest of receipted record 6-8 (including any new identifying information). A positive match validates the digital signature 11 and establishes that:

(1) the record 6 and ending information in the repository 5 are the same as the record 6 and ending information communicated to the remote location;
(2) the signer had the private key necessary to digitally sign the authoritative record;
(3) a digital signature has been obtained for the authoritative record and any additional identifying information provided for digital signature 11;
(4) the process of transmitting the record 6, ending information 8, and partial message digest 10 from the repository 5 to the remote location where the message digest was completed was successful;
(5) the process used to compute the digital signature was performed correctly by the electronic device at the remote location; and,
(6) the process of transmitting the digital signature 11 and any identifying information from the remote location to the repository 5 was successful.

Continuing in FIG. 3, after validation of the digital signature 11, the process of revising the authoritative record begins by prepending digital signature 11 to the beginning of the authoritative record 6-8, and appending signature information 12 to the end of authoritative record 6-8. In this embodiment, signature information 12 comprises any identifying information included in the message digest for the digital signature and the message digest used to produce the digital signature. Of course, more or less information can be included or excluded from the signature information 12. The operation of revising the authoritative record is continued in FIG. 4.

Referring to FIG. 4, digital signature 11 has been prepended to, and signature information 12 has been appended to, the authoritative record 6-8, thus increasing the amount of beginning and ending information, respectively. The repository 5 can then receipt the signed record 6-8 and 11-12, by prepending a repository-created digital signature, which serves as receipt 13, to the signed record, and appending identifying receipt information 14 to the signed record. The receipted signed record 6-8 and 11-14 is now the "revised authoritative record" replacing the earlier authoritative record 6-8. When further requests are received for a copy of the record, the revised authoritative record 6-8 and 11-14 will be used to generate the copies following the procedure outlined in the discussion of FIG. 2. As shown in FIG. 4, the copy of the revised authoritative record will consist of record 6 and all ending information; appended information 8, 12, and 14, in this case. The process of transmitting a copy of the authoritative record over the partially un-trusted network 4 is then repeated, wherein the transmission is normally encrypted with a symmetric key to produce encrypted copy 15 which the requestor decrypts using the symmetric key at a remote location.

Figure 5:
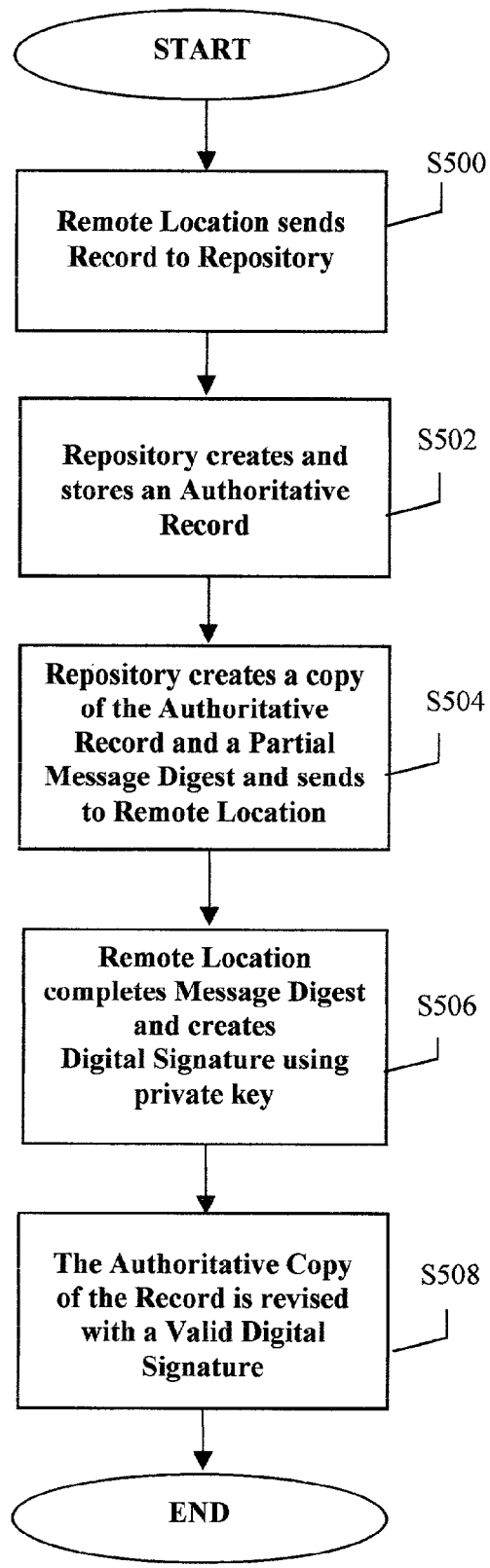
FIG. 5 is a flow chart illustrating the overall operation of the present system.

FIG. 5 is a flow chart for the overall operation of the present system. In step S500, an electronic record is sent to the repository 5 from a remote location. In step S502, a unique authoritative record is created and stored within repository 5. When a person at a remote location wants to sign the authoritative record, a copy of the authoritative record is made that is distinctly different from, but perceptively the same as, the authoritative record. The distinctly different copy and a partial message digest for the beginning information are sent to the person, at step S504. The copy of the authoritative record and the partial message digest can, of course, be sent in two separate steps. In step S506, the message digest is completed at the remote location using the copy of the authoritative record and identifying information as input, and the remote location uses a private key and the completed message digest to create the digital signature. The digital signature and identifying information is then transmitted to the repository 5 where the digital signature is validated and upon affirmative validation, the authoritative record is revised with the digital signature and other information, step S508.

Figure 6A:
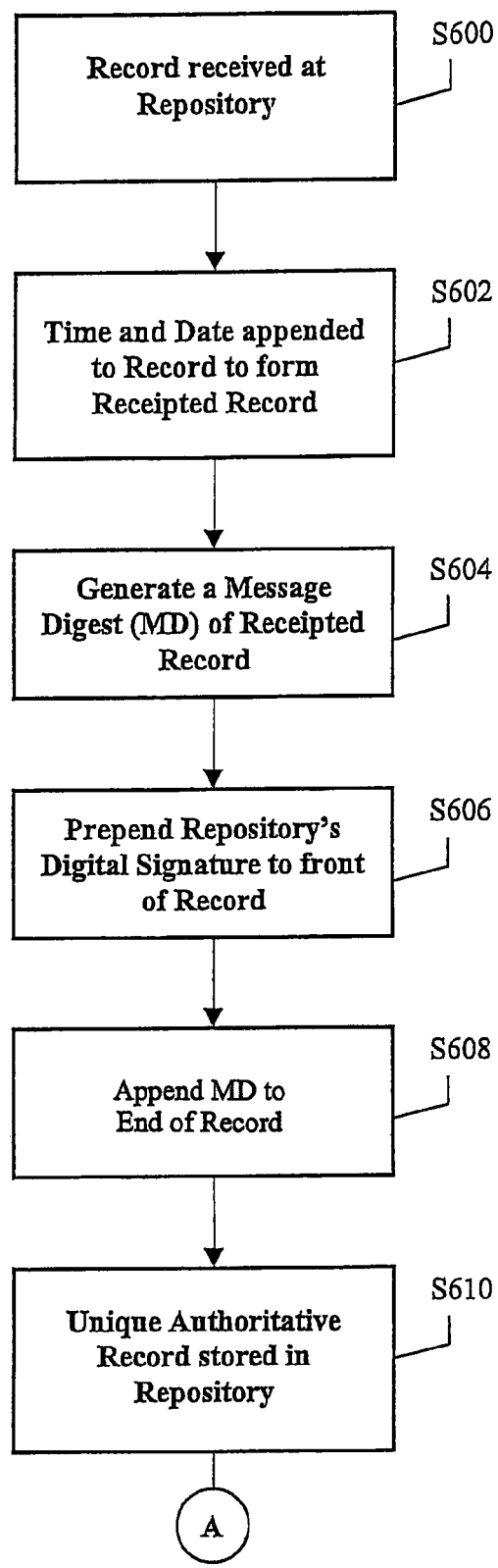
FIG. 6A is a flow chart illustrating the receipt of a record in the secure environment.

FIGS. 6A–6D provide a detailed flow chart of exemplary embodiments for carrying out the method discussed in association with FIG. 5. In FIG. 6A, an exemplary embodiment for receipting a record in repository 5 and generating the initial authoritative record is illustrated. In step S600 the record is received in the present repository, which may also be referred to as a trusted repository. In step S602 a time stamp is completed for and appended to the record as part of some identifying information. The phrase "receipted record", as it pertains to FIG. 6A, refers to any record received by the secure environment that has been time-stamped in this manner. Step S602 is the first step in generating the initial authoritative record.

The authoritative record is important because the authoritative record is the record that must remain unique, to ensure legal enforceability under current electronic transaction laws. In step S604, a single message digest is generated of the record and identifying information, which includes the time stamp. In step S606 a digital signature, which serves as a receipt, is created using the message digest and a private key, and this receipt is then prepended to the beginning of the record. The prepended receipt and any later prepended information is referred to as "beginning information". In step S608 information related to the receipt (such as, for example, the message digest corresponding to the receipt) is appended to the end of the record. The appended information, including the time stamp and other previously appended information, and any later appended information, is referred to as "ending information". The record together with beginning information and ending information make up the "authoritative record" and at step S610 the authoritative record is stored in the repository 5.

Figure 6B:
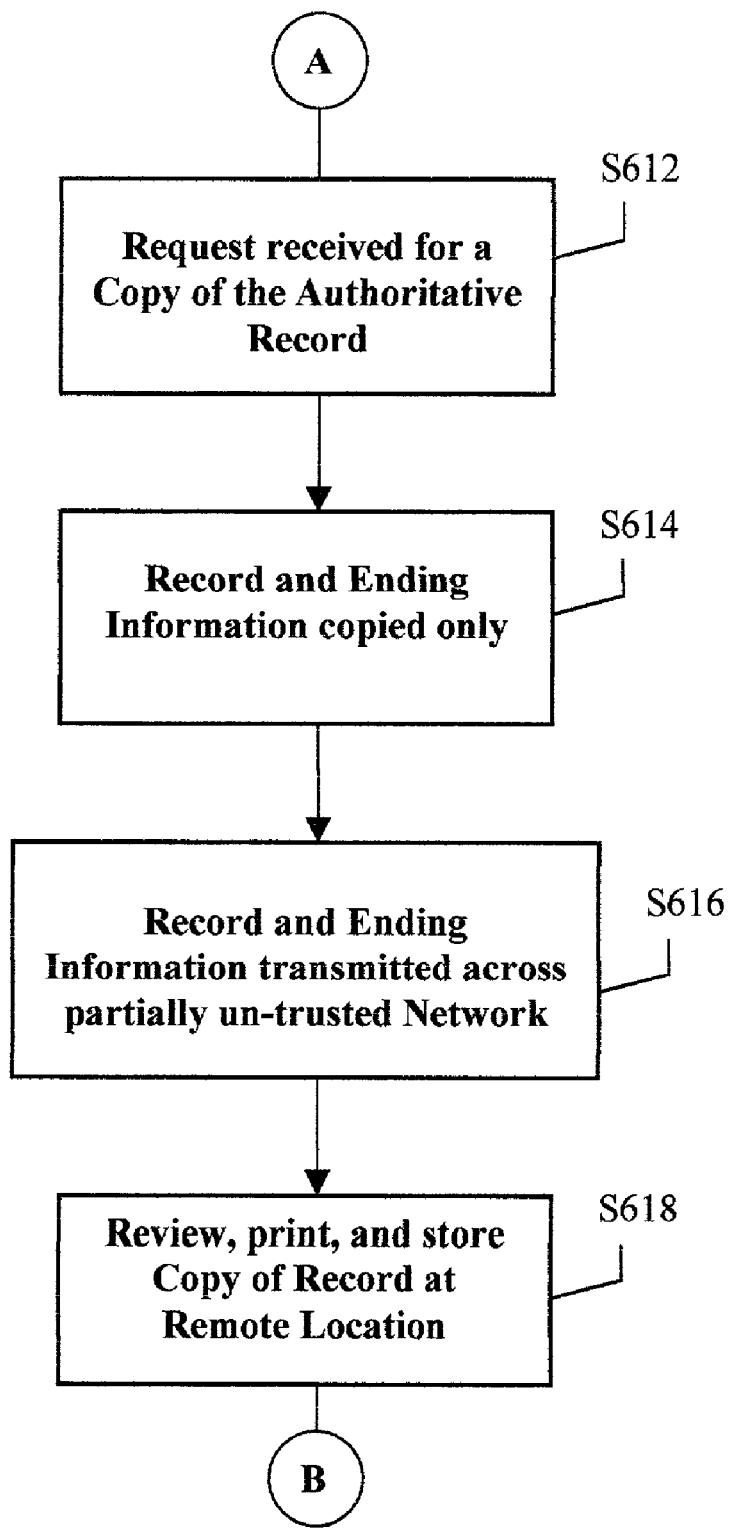
FIG. 6B is a flow chart illustrating the steps involved in making a copy of an authoritative record.

FIG. 6B is a flow chart detailing an exemplary method of transmitting a distinct copy of the authoritative record. In step S612, a request is received from a remote location for a copy of an authoritative record in the repository 5. In step S614, the copy is made by copying only the record and ending information of the requested authoritative record. The copy of the authoritative record is then transmitted, in an industry-standard encrypted manner, over a network that may be partially un-trusted, in step S616. It may be noted at this point that a copy of an authoritative record is now in the hands of a person at a remote location, but the authoritative record in the repository is still unique. At step S618, the requestor is free to store and print the copy of the authoritative record at the remote location for thorough review prior to signing.

Figure 6C:
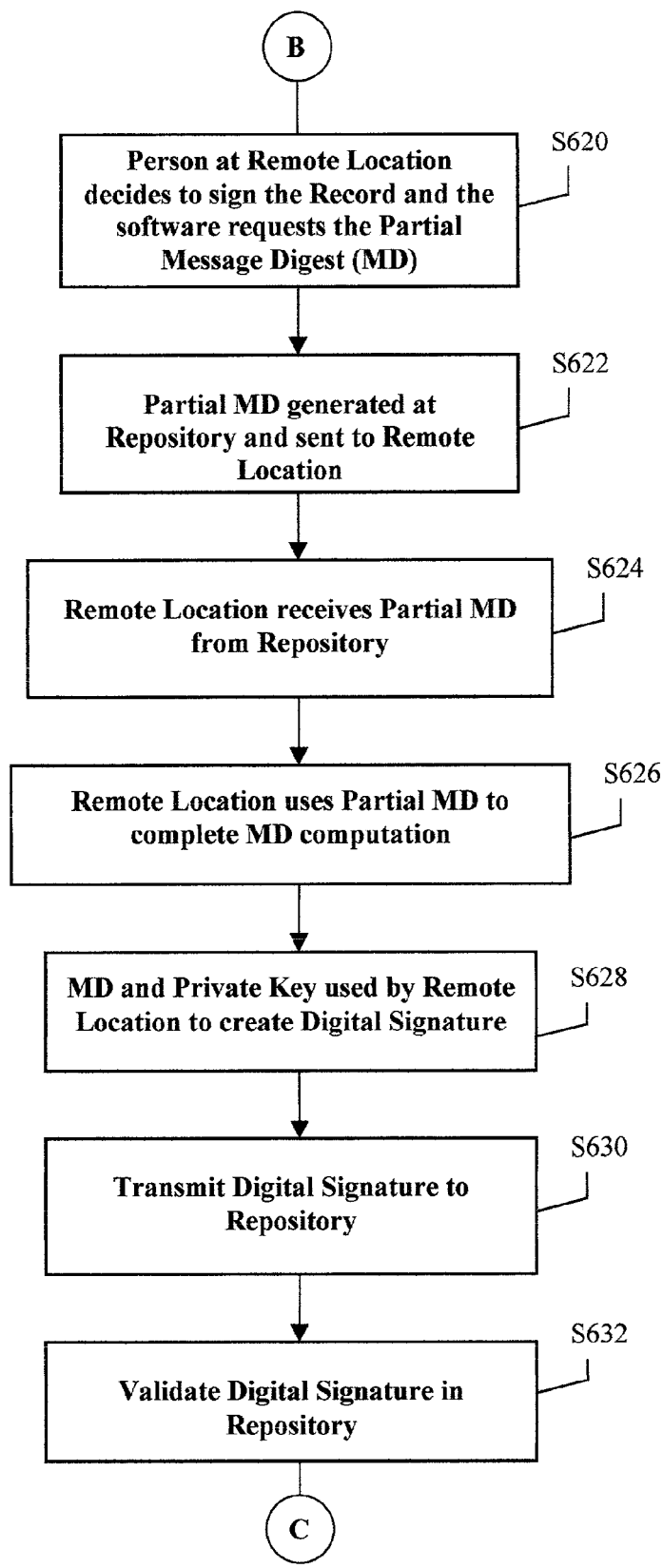
FIG. 6C is a flow chart showing the generation of a digital signature by a person at a remote location and its validation at the repository.

FIG. 6C details the signing operation by a person at a remote location. Prior to signing the authoritative record, portions of the record maintenance software have been loaded on the signatory's computer or workstation. At step S620 the person decides to sign the authoritative record. In order to sign the record the person must first create a message digest of the authoritative record. Since the person at the remote location does not have the beginning information, which was retained in the repository 5, the software requests additional information from the repository 5. At step S622, the repository 5 in response generates a partial message digest using the beginning information as input and transmits the partial message digest to the remote location. The partial message digest comprises interim chaining values of the beginning information (which additionally includes any required padding) and the length of the beginning information (along with any padding). If by chance a second person has signed the same authoritative record, between the time the first person requested the record at step S612 and decided to sign the record at step S620, then the system takes appropriate steps to make sure the first person receives and signs a revised authoritative record. Primarily, the first person is notified of the new signature and is sent a revised copy and a revised partial message digest. The person then continues with the normal signing process described below.

At step S624 the person receives the partial message digest. At step S626, the remote location uses the interim chaining values of the partial message digest to reseed the message digest algorithm and complete a message digest for the authoritative record that was begun in the repository 5 possibly appending user-added information to the end of the record before completing the message digest. In step S628 the resulting message digest is then used along with the person's private key to generate a digital signature. In step S630 the digital signature, along with any user added information, is transmitted to the repository 5. And in step S632 the signature is validated in the repository 5. The first step in validation is computing a single message digest of both the authoritative record stored in the repository 5 and any additional identifying information added by the signer.

Using this computed message digest, the uploaded digital signature, and the corresponding public key, the digital signature is validated by either using a validating algorithm in the case of a DSA-type digital signature or message digest comparison in the case of a RSA-type digital signature. A validation or perfect match indicates a valid digital signature.

Figure 6D:
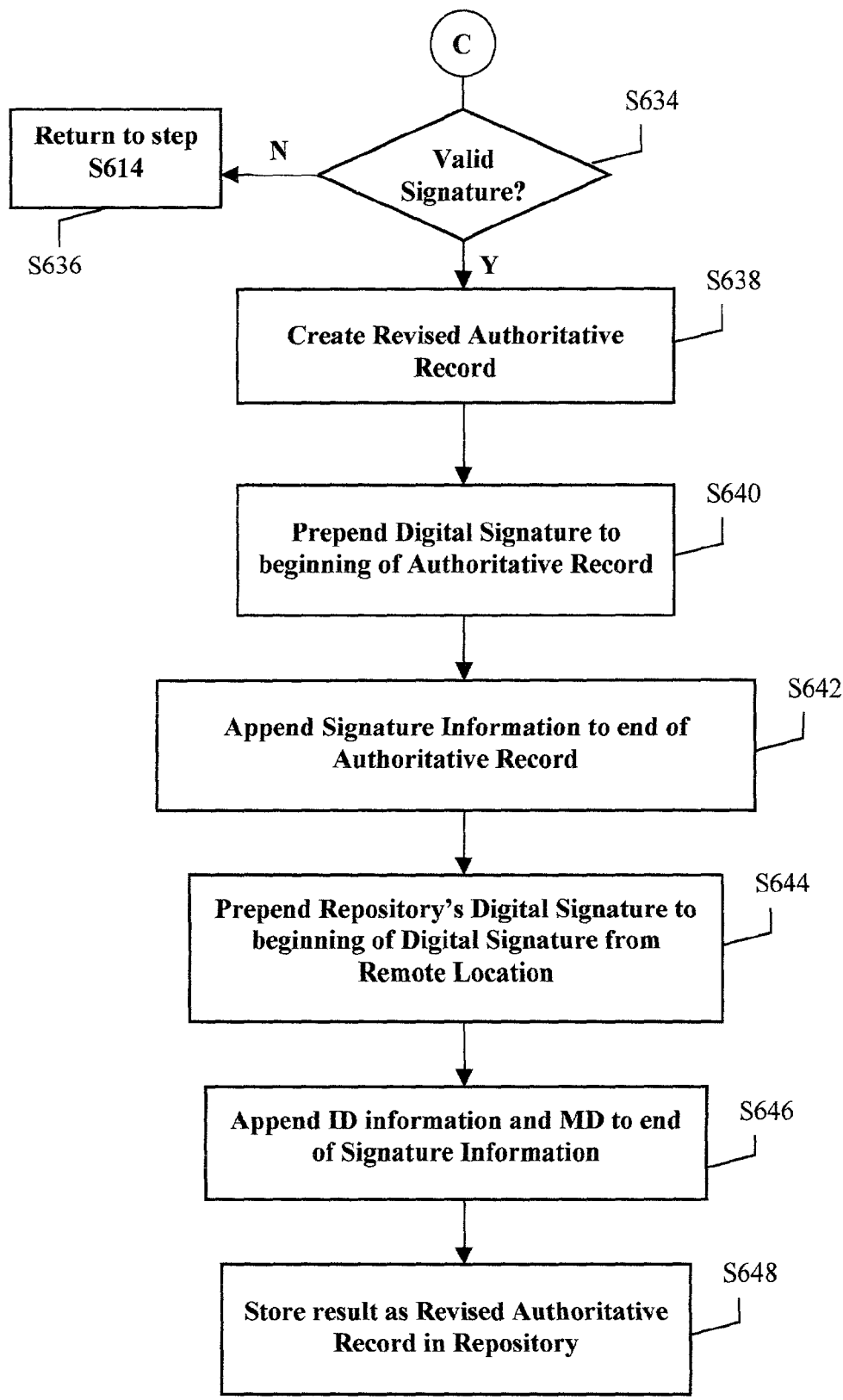
FIG. 6D is a flow chart showing the steps of generating a revised authoritative record at the repository.

FIG. 6D illustrates the steps for revising the authoritative record once a digital signature has been validated. A decision is made in step S634. If the digital signature was not validated in step S632 then the process must restart at step S614 where a new copy will be made and sent to the remote location. If, at step S634, the signature was determined to be valid, then we proceed to step S638 where authorization is given to create a revised authoritative record. Generating a revised authoritative record, in a preferred embodiment, involves prepending the digital signature to the beginning of the current authoritative record and appending signature information to the end of the current authoritative record. In step S640 the digital signature is prepended to the beginning of the authoritative record. It should be understood that the digital signature may have additional information attached thereto prior to prepending. In step S642 signature information, which includes the message digest used to create the digital signature at the remote location, and which may also include additional user-added information, is appended to the end of the authoritative record. In step S644 a receipt of the partially revised authoritative record is prepended to the beginning of the partially revised authoritative record, i.e., the beginning of the prepended digital signature. And in step S646 identifying information for the receipt of the partially revised authoritative record is appended to the end of the partially revised authoritative record, i.e., to the end of the signature information. This combination of the digital signature and repository receipt prepended to the "old" authoritative record and the signatory information and identifying information appended to the "old" authoritative record is the "revised authoritative record". At step S648 the revised authoritative record is stored in the repository 5. It should also be understood that previous artifact records, receipts, digital signatures, identifying information, etc., may also be maintained separately in the repository 5.

The foregoing description of the specific embodiments will so fully reveal the general nature of the invention that others can, by applying current knowledge, readily modify and/or adapt for various applications such specific embodiments without departing from the generic concept. For example, a revised authoritative record could be created with only one beginning information and one ending information appended to the prior authoritative record. Therefore, such adaptations and modifications should and are intended to be comprehended within the meaning and range of equivalents of the disclosed embodiments. It is to be understood that the phraseology of terminology employed herein is for the purpose of description and not of limitation.

We claim:

1. A method for creating a unique authoritative record, obtaining and validating a digital signature on the authoritative record, and upon successful validation creating a unique revised authoritative record, comprising the steps of:
   receiving a record in a secure environment, wherein the secure environment is connected to a network and comprises at least one server that stores and executes software;
   generating identifying information;
   generating a receipt, wherein the receipt includes a digital signature of a combination of the record and the appended identifying information;
   generating supplemental information that includes a provable representation of the receipt;
   prepending the receipt to a beginning of the record;
   appending the identifying information and supplemental information to an ending of the record;
   storing the record with prepended receipt and appended identifying information and supplemental information as the unique authoritative record;
   receiving a request to sign the authoritative record;
   computing a partially completed message digest of the authoritative record, wherein the partial message digest is related to a proper subset of the authoritative record;
   sending the partial message digest and at least a complement of the proper subset of the authoritative record to a remote location;
   completing the computation of the message digest, at the remote location, using the partial message digest, the complement of the proper subset and other identifying information;
   creating a digital signature with the use of the message digest and a private key;
   transmitting at least the digital signature and the other identifying information to the secure environment;
   validating the digital signature in the secure environment, and upon affirmative validation;
   revising the authoritative record with the digital signature and other information to create a revised authoritative record.

2. The method of claim 1, wherein the step of receiving a record further comprises time-stamping the record, wherein the time-stamp is later attached to the record as part of the identifying information, such that the time-stamp becomes part of the record, wherein the time-stamp comprises a time and date the record was received.

3. The method of claim 1, wherein the digital signature included in the receipt is made with a private key of the secure environment.

4. The method of claim 1, wherein the proper subset of the authoritative record comprises information at a beginning of the authoritative record.

5. The method of claim 1, wherein the complement of the proper subset of the authoritative record comprises the record and ending information that is appended at an end of the record.

6. The method of claim 1, wherein the step of sending further comprises the steps of sending the partial message digest and the complement of the proper subset of the authoritative record to the remote location in two separate transmissions.

7. The method of claim 1, wherein software associated with the secure environment is used at the remote location.

8. A method for creating and validating at least one digital signature for an electronic authoritative record maintained in a secure environment, wherein control is maintained in the secure environment by software and at least one server, and a copy of the electronic authoritative record can be electronically transmitted to a remote location without losing any of the electronic authoritative record's integrity, the method comprising the steps of:
   receiving an electronic record in the secure environment;
   generating at least some identifying information;
   generating at least some first information comprising a receipt of the electronic record by the secure environment;
   defining a beginning information as all information prepended to a beginning of the record and comprising the first information;
   generating at least some second information comprising at least a provable representation of the first information, wherein the provable representation of the first information is mathematically related to the first information;
   defining an ending information as all information appended to an end of the record and comprising the identifying information and the second information;
   creating an authoritative record comprising the beginning information, the electronic record, and the ending information, wherein the beginning information is prepended to the beginning of the electronic record and the ending information is appended to the end of the electronic record;

storing the authoritative record in the secure environment;

making a perceivable copy of the authoritative record by copying only the electronic record and the ending information;

transmitting the perceivable copy of the authoritative record to a remote location;

receiving the perceivable copy at the remote location, and if desired digitally signing the authoritative record by:

generating a partially complete message digest, at the secure environment, of the authoritative record, wherein the partial message digest is related to the beginning information;

transmitting the partial message digest from the secure environment to the remote location, completing a message digest of the authoritative record at the remote location with the use of the partial message digest, the perceivable copy, and other identifying information;

and, creating a digital signature at the remote location using the message digest and a private key to produce a digital signature of the authoritative record;

transmitting at least the digital signature and the other identifying information from the remote location to the secure environment;

receiving the digital signature and the other identifying information in the secure environment;

validating the digital signature in the secure environment with the use of the digital signature, a corresponding public key of the private key, and a separately computed message digest of the combination of the authoritative record and the received identifying information in the secure environment, and upon affirmative validation of the digital signature;

generating a revised authoritative record by prepending digital signature information comprising at least the digital signature to a beginning of the authoritative record, wherein the digital signature information is thereby included in the beginning information, appending signature information comprising at least the received identifying information and a provable representation of the digital signature information to an end of the authoritative record, wherein the ending information thereby includes the signature information;

and, storing the revised authoritative record in the secure environment.

9. The method of claim 8, wherein the step of generating a revised authoritative record, further comprises: prepending a signature receipt to the beginning information so that the signature receipt becomes part of the beginning information, wherein the signature receipt comprises at least a unique representation of the revised authoritative record, wherein the unique representation comprises a digital signature; and, appending identifying information and supplemental information to the ending information so that the identifying information and the supplemental information become part of the ending information, wherein the supplemental information comprises a provable representation of the signature receipt.

10. The method of claim 8, wherein software associated with the secure environment is stored and used at the remote location.

11. The method of claim 8, wherein the perceivable copy and the partial message digest are transmitted to the remote location in a same transmission.

12. The method of claim 8, further comprising the steps of: sending copies of the revised authoritative record to one or more remote locations by treating the revised authoritative record as the authoritative record and repeating the steps of: making a perceivable copy; transmitting the perceivable copy; receiving the perceivable copy; generating a partial message digest; transmitting the partial message digest; completing a message digest; creating a digital signature; transmitting the digital signature; receiving the digital signature; validating the digital signature; and, generating a revised authoritative record.

13. The method of claim 8, further comprising the steps of: sending copies of the revised authoritative record to one or more remote locations by treating the revised authoritative record as the authoritative record and repeating the steps of: making a perceivable copy; transmitting the perceivable copy; receiving the perceivable copy; generating a partial message digest; transmitting the partial message digest; completing a message digest; creating a digital signature; transmitting the digital signature; receiving the digital signature; validating the digital signature; generating a revised authoritative record; prepending a signature receipt; and, appending identifying information and supplemental information.

14. The method of claim 8, wherein the step of receiving an electronic record further comprises: time-stamping the electronic record, wherein the time-stamp is later attached to the record as part of the identifying information, such that the time-stamp becomes part of the record, wherein the time-stamp comprises a time and date the record was received.

15. The method of claim 8, wherein the receipt comprises at least a digital signature made with a private key of the secure environment.

16. The method of claim 8, wherein the provable representation of the first information comprises at least a message digest that was used to generate the first information.

17. The method of claim 8, wherein the step of transmitting the perceivable copy, further comprises: transmitting a cryptographic version of the copy.

18. The method of claim 8, wherein the partial message digest includes information necessary to continue the creation of the message digest at the remote location.

19. The method of claim 8, wherein the step of validating further comprises the steps of: decrypting the digital signature with a public key; and, comparing the decrypted digital signature with a message digest of the combination of the authoritative record stored in the secure environment and the received identifying information.

20. A system for creating a unique authoritative record, obtaining and validating a digital signature on the authoritative record, and upon successful validation creating a unique revised authoritative record, comprising: at least one server, connected to a network, that stores and executes software that creates a secure environment and at least one computer at a remote location that stores and executes at least a portion of the software, wherein the software provides for:

receiving a record in the secure environment;

generating identifying information;

generating a receipt, wherein the receipt includes a digital signature of the combination of the authoritative record and the appended identifying information;

generating supplemental information that includes a provable representation of the receipt;

prepending the receipt to a beginning of the record;

appending the identifying information and the supplemental information to an ending of the record;

storing, in the secure environment, the record with prepended receipt and appended identifying information and supplemental information as the unique authoritative record;

receiving a request, from the remote location, to sign the authoritative record;

computing a partially completed message digest, at the secure environment, of the authoritative record, wherein the partial message digest is related to a proper subset of the authoritative record;

sending the partial message digest and at least a complement of the proper subset of the authoritative record to the remote location;

completing the computation of the message digest, at the remote location, using the partial message digest and the complement of the proper subset, and other identifying information;

creating a digital signature with the use of the message digest and a private key;

transmitting at least the digital signature and the other identifying information from the remote location to the secure environment;

validating the digital signature in the secure environment, and upon affirmative validation;

revising the authoritative record with the digital signature and other information to create a revised authoritative record.

21. The system of claim 20, wherein the record is time-stamped, immediately after it is received by the secure environment, with a time-stamp comprising a time and date the record was received.

22. The system of claim 20, wherein the digital signature included in the receipt is made with a private key of the secure environment.

23. The system of claim 20, wherein the proper subset of the authoritative record comprises information at a beginning of the authoritative record.

24. The system of claim 20, wherein the complement of the proper subset of the authoritative record comprises the record and ending information that is appended at an end of the record.

25. The system of claim 20, wherein the partial message digest and the complement of the proper subset of the authoritative record are sent to the remote location in two separate transmissions.

26. A system for creating and validating at least one digital signature on an electronic authoritative record that is maintained in a secure environment, wherein a copy of the electronic authoritative record can be electronically transmitted to a remote location without losing any of the electronic authoritative record's integrity, the system comprising: at least one server, connected to a network, that stores and executes software that creates the secure environment and at least one computer at a remote location that stores and executes a portion of the software, wherein the software provides for:

receiving an electronic record in the secure environment;

generating at least some identifying information;

generating at least some first information comprising a receipt of the electronic record by the secure environment;

defining a beginning information as all information prepended to a beginning of the record and comprising the first information;

generating at least some second information comprising at least a provable representation of the first information, wherein the provable representation of the first information is mathematically related to the first information;

defining an ending information as all information appended to an end of the record and comprising the identifying information and the second information;

creating an authoritative record comprising the beginning information, the electronic record, and the ending information, wherein the beginning information is prepended to the beginning of the electronic record and the ending information is appended to the end of the electronic record;

storing the authoritative record in the secure environment;

making a perceivable copy of the authoritative record by copying only the electronic record and the ending information;

transmitting the perceivable copy of the authoritative record to a person at the remote location;

receiving the perceivable copy at the remote location, and if desired digitally signing the authoritative record by:

generating a partially completed message digest, at the secure environment, of the authoritative record, wherein the partial message digest is related to the beginning information;

transmitting the partial message digest from the secure environment to the remote location, completing a message digest of the authoritative record at the remote location with the use of the partial message digest, the perceivable copy, and other identifying information;

and, creating a digital signature at the remote location using the message digest and a private key to produce the digital signature of the authoritative record;

transmitting at least the digital signature and the other identifying information from the remote location to the secure environment;

receiving the digital signature and the other identifying information in the secure environment;

validating the digital signature in the secure environment with the use of the digital signature, a corresponding public key of the private key, and a separately computed message digest of the combination of the authoritative record and the received identifying information in the secure environment, and upon affirmative validation of the digital signature;

generating a revised authoritative record by prepending digital signature information comprising at least the digital signature to a beginning of the authoritative record, wherein the digital signature information is thereby included in the beginning information, appending signature information comprising at least the received identifying information and a provable representation of the digital signature information to an end of the authoritative record, wherein the ending information thereby includes the signature information;

and, storing the revised authoritative record in the secure environment.

27. The system of claim 26, wherein generating a revised authoritative record, further comprises: prepending a signature receipt to the beginning information so that the signature receipt becomes part of the beginning information, wherein the signature receipt comprises at least a unique representation of the revised authoritative record, wherein the unique representation comprises a digital signature; and, appending identifying information and supplemental information to the ending information so that the identifying information and supplemental information become part of the ending information, wherein the supplemental information comprises a provable representation of the signature receipt.

28. The system of claim 26, wherein the perceivable copy and the partial message digest are transmitted to the remote location in a same transmission.

29. The system of claim 26, wherein the software further provides for sending copies of the revised authoritative record to one or more remote locations by treating the revised authoritative record as the authoritative record and repeating the steps of: making a perceivable copy; transmitting the perceivable copy; receiving the perceivable copy; generating a partial message digest; transmitting the partial message digest; completing a message digest; creating a digital signature; transmitting the digital signature; receiving the digital signature; validating the digital signature; and, generating a revised authoritative record.

30. The system of claim 26, wherein the software further provides for sending copies of the revised authoritative record to one or more remote locations by treating the revised authoritative record as the authoritative record and repeating the steps of: making a perceivable copy; transmitting the perceivable copy; receiving the perceivable copy; generating a partial message digest; transmitting the partial message digest; completing a message digest; creating a digital signature; transmitting the digital signature; receiving the digital signature; validating the digital signature; generating a revised authoritative record; prepending a signature receipt; and, appending identifying information and supplemental information.

31. The system of claim 26, wherein the electronic record is time-stamped immediately after being received in the secure environment, and the time-stamp comprises a time and date of receipt.

32. The system of claim 26, wherein the receipt comprises at least a digital signature made with a private key of the secure environment.

33. The system of claim 26, wherein the provable representation of the first information comprises at least a message digest that was used to generate the first information.

34. The system of claim 26, wherein a cryptographic version of the perceivable copy is transmitted to the remote location.

35. The system of claim 26, wherein the partial message digest includes information necessary to continue the creation of the message digest at the remote location.

36. The system of claim 26, wherein validation further comprises: decrypting the digital signature with a public key; and, comparing the decrypted digital signature with a message digest of the combination of the authoritative record stored in the secure environment and the received identifying information.

* * * * *